Sept. 11, 1934.   C. W. BAUER ET AL   1,972,972

COLOR PHOTOGRAPH AND METHOD OF PRODUCING SAME

Filed June 11, 1932

INVENTORS
CHARLES W. BAUER
HENRY KOHLBACHER
BY
ATTORNEY

Patented Sept. 11, 1934

1,972,972

UNITED STATES PATENT OFFICE 1,972,972

COLOR PHOTOGRAPH AND METHOD OF PRODUCING SAME

Charles W. Bauer, Fairview, and Henry Kohlbacher, Newark, N. J.

Application June 11, 1932, Serial No. 616,592

9 Claims. (Cl. 95—2)

This invention relates to color photography and particularly to the production of pictures or transparencies in natural colors by what is known as the additive method.

The principal object of the invention is to produce colored pictures and particularly colored motion picture films which retain all the sharp, clear-cut definition of the best quality black and white pictures.

Another object of the invention is to produce colored motion picture films of this type which are of the same length as black and white films and which can be run in any standard projector at standard speeds and without special attachments.

Inventors and research workers have for years made every effort and spent considerable sums of money endeavoring to produce additively colored motion picture films, but they have met with very little success because of the apparently unsurmountable difficulties encountered. Most of the early workers in this field attempted to reproduce natural colors additively by photographing images on color sensitive silver emulsions through colored screen plates and although screens of various designs were used, and very pleasing results were obtained on glass plates in the realm of still photography, motion picture films have never been successfully produced by this method.

Attempts have been made to use substitutes of the above methods in making colored motion pictures, usually by applying colored screen elements of linear or other design directly to the negative, for example by applying ruled lines of color either directly to the emulsion or to the transparent support. Workers in this field have either prepared the positive in a like manner and attempted to register the rulings and picture values of the negative with the rulings of the positive, or have removed the rulings from the negative after photographing and made direct contact printing to the positive from the negative with the hope of registering the color lines with the color values after printing and developing. The principal difficulty with this procedure is that there is always a shrinkage in the negative after developing, and a shrinkage in the positive after printing and developing, and both of these shrinkages are an unknown quantity and cannot be accurately predetermined or compensated.

After much investigation and after years of research and experiment we have succeeded in producing positive motion picture films by the additive method retaining all of the sharp, clear-cut definition of the best quality black and white pictures combined with color directly applied to the film, wherein are embodied novel features which permit the manufacture of commercial films which are of the same length as black and white films and which can be run in any standard projector at standard speeds and without special attachments.

We have departed entirely from any attempt to secure negative records through colored screen elements, by which is meant the application of linear, mosaic or other design of light filtering media for the segregation of color values either directly to or in conjunction with the negative silver sensitive emulsion, but have preferred to photograph the entire subject through separately selective filters for each color component. For example, to secure the red color values existing in a scene or subject we have photographed the entire scene through a selective red color filter, and on the entire picture area of the light sensitive emulsion we get a record of only such colors as the red filter will transmit; and likewise with a green filter we obtain, on a separate picture area, from the red values, only such record as the green filter will transmit.

As both of these pictures are photographed simultaneously through a suitable optical system we obtain a negative film with alternating red and green value images. With a suitable optical system, the sets of color value images may be recorded on separate films so that all the red values will be on one film and all of the green values will be on another film, the only requirement being that the different values and films be in some way indicated from a common starting point and that the pairs follow in sequence. In this way we obtain negative records which may be of two or more colors, although for the purpose of illustrating the invention we shall select the two colors red and green.

In making the positive reproduction we employ, for purposes of illustrating the invention, a transparent support having a coating of light sensitive emulsion on both sides, the emulsion having incorporated within it a light retarding fugitive dye to prevent lateral dispersion of the rays from the printing light in the emulsion and too much penetration. We may, however, employ a positive film having a light sensitive emulsion or separate emulsions on only one side, part of the printing operations being carried on through the transparent support and the other printing operations being carried on in direct contact with the top surface of the emulsion. In such case the emulsion also carries a light retarding fugitive dye to prevent penetration and lateral dispersion of the light rays through the emulsion.

In printing the positive from the negative we employ two screen plates which preferably consist of black lines and transparent spaces alternating with each other, although screen plates of other design may be used equally as well. One of these screen plates has the black lines and clear spaces equally proportioned, while the other has the same number of lines per inch as the first screen plate but has its black lines narrower than its clear spaces. For purposes of illustration, we have used a screen plate of equal proportions having four hundred black lines and four hundred clear spaces to the inch, and a screen plate of unequal proportions having the same number of lines per inch but with clear spaces twice the width of the black lines. In printing, the screen plate of unequal proportions is preferably held in front of the picture surface of the positive film, while the screen plate of equal proportions is held against the back of the positive film which is later to contain the lines of color. The negative film is located in a suitable position at the front of the screen plate of unequal proportions and one frame, say a frame containing a red value image, is exposed to light and the image is projected upon the picture surface of the positive film through the clear spaces of said screen plate. Since the black lines of the screen plate will not transmit light it is apparent that only parts of the red record will be imprinted on the light sensitive emulsion of the positive film in a series of lines alternating with a series of lines of unexposed light sensitive emulsion in the same picture area.

After printing the red record the positive film and the screen plate of equal proportions are still held in the same position, while the screen plate of unequal proportions is displaced laterally so that the black lines of said screen plate will be centrally located in the previously exposed red record; but, as the black lines of the screen plate are not quite as wide as the clear spaces through which the red record was printed, the red record will be almost, but not entirely, covered by the said black lines, and the red record will therefore be susceptible to further printing at both edges of the lines of the red value record. While the positive film and the screen plate of equal proportions are thus held stationary, and while the screen plate of unequal proportions is thus displaced laterally, the negative film is moved in a longitudinal direction to bring the corresponding green value picture of the pair into position for printing.

Light is then passed through the negative and through the clear spaces of the laterally displaced screen plate, and a record of the green values is photographically printed on the previously unexposed emulsion of the positive film. In this way the green values are printed in lines next to and partially overlapping the aforementioned lines of the red record, thus giving records of both the red and green values alternating with each other and with double exposed or black subdividing lines of both values in register in one frame of a single picture area. At or about the same time as the record of the green value negative image is being imprinted on the positive film, light is permitted to pass through the clear spaces of the screen plate of equal proportions at the opposite side of the positive film. This screen plate is so placed as to print a record of lines only on the emulsion opposite to the emulsion which has received the records of the red and green values.

We have thus obtained a complete record in perfect register of both the red and green value images alternating with each other and alternating with double exposed subdividing lines on one side of the positive film, and on the opposite side of the same film we have lines of exposed light sensitive silver emulsion in register with the red value record and alternate lines of soft unexposed silver emulsion in register with the green value record. These lines of exposed light sensitive silver emulsion are subsequently dyed red, while the alternate lines of soft unexposed silver emulsion are dyed green in a manner hereinafter described.

The black lines preferably subdivide the red and green color value positive images as stated above, but they may be arranged in a separate stratum between the color value images and the color lines, or they may be arranged between the lines of color. These lines are an important feature of the invention as they confine the rays of light passing through the red and green lines and the red and green value black and white images in their proper channels in projecting. Another important advantage of these lines is that they permit either broadening or narrowing of the red and green lines of color and also permit variations in the intensity of the colors. Still another important function of these black lines is to avoid the creation of unexposed transparent lines between the lines of color value images which might otherwise be created due to excess wear or other inequalities in the printing mechanism or to other causes. The functions and advantages of these lines will be explained more in detail in the following description.

The invention will be described in connection with the accompanying drawing, in which.

Figure 1:
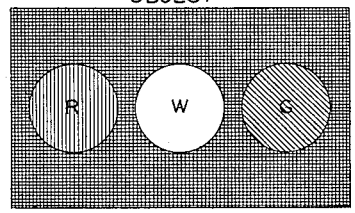
Fig. 1 is a diagrammatic view of an object to be photographed.
Figure 2:
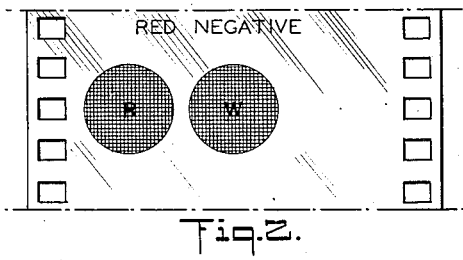
Fig. 2 is a red color value negative.
Figure 3:
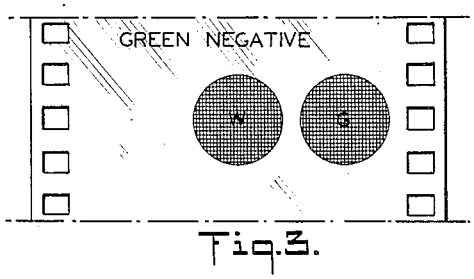
Fig. 3 is a green color value negative.

In the drawing, Fig. 1 shows an object having a red section R, a green section G and a white section W on a black background. Figs. 2 and 3 show the two color value negatives, the former being taken through a red filter and the latter through a green filter. The red and green pairs may be recorded on separate films, but for the purpose of this description it will be assumed that they alternate with each other on a single strip of film.

Figure 4:
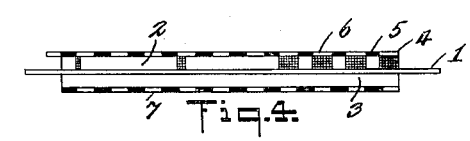
Fig. 4 shows the step of printing the red color value positive.

The positive film shown in Fig. 4 comprises a transparent support 1 having an emulsion 2 on one side and an emulsion 3 on the opposite side. These emulsions preferably contain a light retarding fugitive dye to prevent lateral dispersion of the rays from the printing light. The emulsion 2 is on the front or picture surface of the film, while emulsion 3 is on the back of the film and is intended to contain the colored areas as hereinafter described.

In printing the positive from the red and green value negatives a glass screen plate 4 is held between the negative film and the positive film. This screen plate has black or other opaque lines 5 and transparent spaces 6 alternating with each other, and in this screen plate the opaque lines are slightly narrower than the transparent spaces. A second glass screen plate 7 is held against the back of the positive film and has alternating black lines and transparent spaces of equal width. These lines and spaces are greatly enlarged and exaggerated in the drawing in order to show the arrangement more clearly.

In practice, the screen plate 4 is preferably held in contact with the picture surface of the positive film, and is interposed between the positive film and an objective lens through and by which the color value negative images are projected optically onto and through the clear spaces 6 of the screen plate. A suitable machine for carrying out this method of printing is disclosed in a copending application of C. W. Bauer, Serial No. 619,305, filed June 25, 1932.

Figure 5:
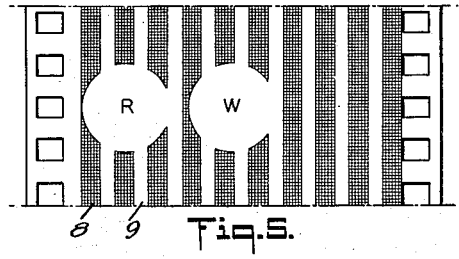
Fig. 5 is the picture surface of the positive printed from the red color value negative.

It will be assumed that the red record is printed first and, since the black lines 5 of the screen plate will not transmit light, it is evident that only parts of the red record will be imprinted on the light sensitive emulsion 2 in a series of black lines 8 alternating with a series of lines 9 of unexposed light sensitive emulsion in the same picture area, as shown in Fig. 5.

Figure 6:
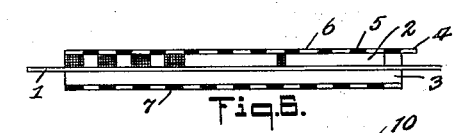
Fig. 6 shows the step of printing the green color values on the said picture surface of the positive.
Figure 7:
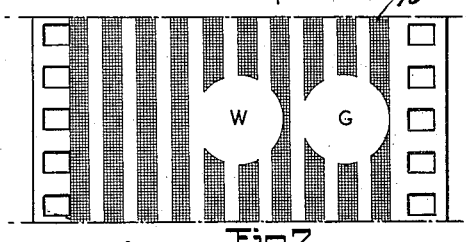
Fig. 7 is the picture surface of the positive showing only the green color values.
Figure 8:
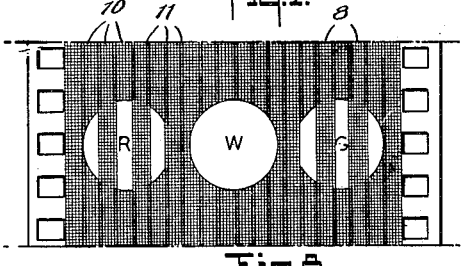
Fig. 8 is the picture surface of the positive showing both the red and green color values.

After printing the red record, the positive film and the screen plate 7 are still held in the same position, while the negative film is moved in a longitudinal direction to bring the green value picture of the pair into position for printing. At the same time the screen plate 4 is displaced laterally, or toward the right as viewed in Fig. 6, so that the black lines 5 of said screen plate will be centrally located in the previously exposed red record, that is, the black lines 5 of the screen plate will be in line with the previously printed lines 8 in the emulsion 2. However, as the black lines 5 are not quite as wide as the transparent spaces 6 through which the red record was printed, the black lines 5 of the screen plate will not quite cover the previously printed red record lines 8 on the positive film. Hence, when the green negative is exposed to the printing rays, a record of the green values is printed on the previously unexposed portions of emulsion 2 in the form of a series of lines 10 as shown in Fig. 7, and these lines will slightly overlap the aforementioned lines 8 of the red record so as to form fine double exposed or black dividing lines 11 which separate the red color value images 8 from the green color value images 10 as shown in Fig. 8. The black dividing lines 11 may be of any suitable width, for example they may be about one-tenth the width of the color value lines.

Figure 9:
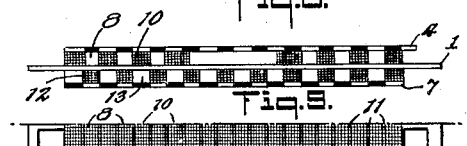
Fig. 9 shows the step of printing the black and white screen lines on the back of the positive.
Figure 10:
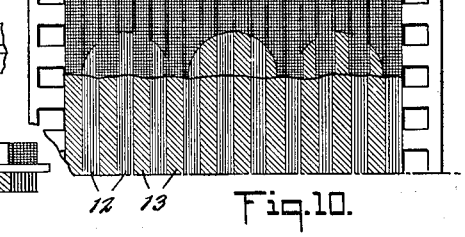
Fig. 10 is the printed positive cut away to show both the front and the back.
Figure 13:
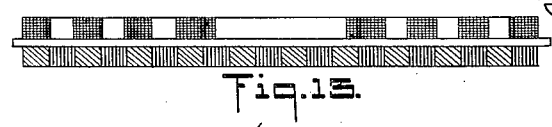
Fig. 13 shows the step of dyeing said unexposed lines with green dye.

At or about the same time as the record of the green value negative image is being imprinted on the positive film, light is permitted to pass through the transparent spaces of the screen plate 7 on the opposite side of the positive film. At this time, as will be noted from Fig. 9, the transparent spaces of screen plate 7 will register with the red value lines 8 formed in the emulsion 2, and hence the light passing through these transparent spaces will form lines 12 of exposed silver emulsion in register with the red value lines 8, and alternating lines 13 of soft unexposed silver emulsion which register with the green value lines 10 as best shown in Fig. 10. The lines 12 of exposed silver emulsion are subsequently dyed red, while the alternate lines of soft unexposed silver emulsion are subsequently dyed green.

The positive film bearing the completely printed and correctly registered record is next developed, fixed, washed and dried in the usual manner, after which the emulsion 2 containing the black and white color value images, in alternate lines or areas separated by narrow black lines 11, is covered with a protective coating of any suitable transparent varnish in order to protect it from subsequent bleaching, washing and coloring operations which are necessary to convert the alternating lines 12 and 13 of the emulsion 3 into lines of color. If desired, coloring may be added to this transparent varnish to obtain special effects. Also, either before or after the aforementioned printing operations, a suitable waterproofing varnish or coating is preferably applied to the edges of the positive film in the area embracing the perforations from the end margin of the picture area outwardly to the extreme edge of the film so that the film may be safely transported by rollers or sprockets through a film-treating machine without disturbing the emulsion.

Figure 11:
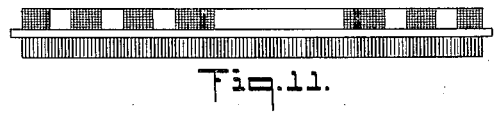
Fig. 11 shows the initial step of dyeing the back of the positive film with red dye.
Figure 12:
Fig. 12 shows the next step of washing the red dye out of the soft or unexposed lines on the back of the film.

After coating the picture side of the positive film as described, the film is immersed in a suitable bleaching batch which converts the black exposed silver lines 12 into transparent lines with the gelatin hardened in situ with the silver grains, leaving the alternate unexposed lines of gelatin 13 soft. The film is next immersed in a suitable red dye having an affinity for the hardened portions. Such dye will enter both the hardened lines 12 and the soft lines 13, as indicated in Fig. 11, but by subsequently washing the film the red dye will be washed out of the soft lines 13 as indicated in Fig. 12. The film is then subjected to a bath of a suitable green dye, such as a dye of the alkyl-sulphonic acids and their derivatives which have a decided affinity for soft gelatin. On subsequently washing the film the green dye will remain in the soft lines 13 and will be washed out of the hardened lines 12 which were previously dyed red. In this way, the emulsion 3 will be converted into alternate areas or lines of red and green which coincide and register with the respective red and green value black and white images in the emulsion 2. The particular dyes or tones and processes for coloring may vary widely, as will appear by reference to patent to Kelley 1,411,- 968, April 4, 1922, and need not be further described herein. Since the alternating black and white color value images are separated by the black lines 11, it will be evident that on projecting such a picture the color lines will be confined to their respective color value images and a picture in substantially natural colors will be reproduced on the screen by the additive method. The finished positive film is of the same length as ordinary black and white films, and can be run on any standard projector and at the same speed as ordinary black and white films without altering the projecting machine or employing any color attachments.

Figure 14:
Fig. 14 shows a modification employing a film having a light sensitive emulsion on only one side of the transparent support.
Figure 14:
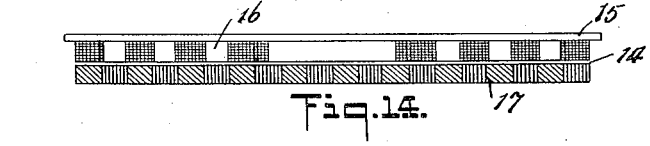

Fig. 14 shows a modification of the invention comprising a positive film having a silver light sensitive emulsion 14 on only one side of the transparent support 15. The emulsion carries a light retarding fugitive dye to prevent penetration and lateral dispersion of the printing rays through the emulsion. The printing of the color value images is carried on through the transparent support 15, with the aid of the screen plate 4, while the printing of the lines is carried on through the screen plate 7 in direct contact with the top or outer surface of the emulsion. In this way the linear color value images are printed on the lower stratum 16 nearest to the transparent support 15, and it will be seen that these lines are superposed on and in register with the colored lines in the outer stratum 17. This film need not be treated with waterproof varnish before bleaching and developing since the side which is free from emulsion may be carried over rollers or sprockets without disturbing the emulsion on the opposite side. In bleaching this film care is taken to prevent the bleach bath from penetrating to the stratum nearest the support which bears the black and white color value images.

The black lines 11 which separate the red and green color value images may be printed either before or after printing said images, and they may be formed in a separate printer if desired. These black lines are of the utmost importance since they confine the rays of light passing through the red and green lines 12 and 13 and the red and green value images 8 and 10 to their proper channels for projecting. We have found that in the absence of such lines a certain amount of light is dispersed laterally through the support, and if some of the light from the red lines passes through the green value images and some of the light from the green lines passes through the red value images, the combination of red and green light through the color value images neutralizes and very seriously diminishes the true colors of the projected picture on the screen. Another important advantage of these black lines is that they permit either broadening or narrowing the red and green lines of color and permit variations in the intensity of the color in said lines, which is accomplished by altering the intensity of the light in printing the lines on the side of the film opposite the lines of the red and green value images.

Another very important advantage of the black lines 11 separating the red and green color value images is that they avoid the creation of unexposed transparent lines between the alternate color value images. Such clear lines could be created as a result of any excess wear in the printing mechanism or in the stops which control the screen plate 4 which is shifted from side to side during the printing operation as previously described. For example, if we were to use a screen plate having black lines and transparent spaces of equal width, and a print was made from the red value negative through the transparent spaces and the screen was then laterally displaced the exact distance of one line before making the print from the green value negative through the transparent spaces of the screen plate, the result would be a positive plate of the two color value images in lines alternating with each other exactly edge to edge, with neither black double exposed lines nor clear unexposed lines at the edges of the color values; but unless the screen plate were centered in exactly the right position the color value lines would not be edge to edge but would overlap along certain edges which would become black lines on developing, and there would be a lack of exposure at the opposite edges which would leave transparent lines between the color values after developing and printing. Such transparent lines in the finished positive would transmit a combination of red and green light to the screen and thereby additively make white, where there should perhaps be no light or light of one color only, and the result would be a surplus of white light on the screen which would seriously counteract the brilliancy and true rendering of all colors and perhaps cause a total loss of one or more colors.

Alternative methods of coloring the hard exposed lines 12 and soft unexposed lines 13 of the emulsion 3 may be employed to achieve substantially the same results. For example, the hard exposed lines 12 may be printed opposite the green value picture areas 10, and bleached and dyed or toned green, while the alternating lines 13 of soft gelatin which will now be registered with the lines 8 of the red value image may be dyed or toned red, thus reversing the procedure outlined above but retaining the areas and their proper relationship to the black and white color value images. Also, the black lines and clear spaces may be converted into lines of color alternating with each other in the same stratum or emulsion by any of the well known toning processes, or combination of dyeing with suitable dyes for one color and toning for the other color; or toning as a mordant for one of the colors by conversion of the silver images into the salts of a metal to make it absorptive to a dye for the one color, and coloring the alternate spaces with a soluble dye for the formation of the other color.

In our process of producing natural color transparencies by the additive method we do not superpose images of different color values and then color them differently, but we do produce images of different color values in lines alternating with each other but in the same stratum and these images are developed and fixed as black and white silver images and remain so as the images are not converted into images of complementary colors, but in register and in conjunction with these black and white color value images we produce in another stratum of the same emulsion elements of transparent colors so that when the combination of black and white color value images and their color component elements is viewed by transmitted light there is reproduced a natural color transparency by the additive method.

It will be evident that the invention is capable of various modifications and adaptations not specifically described but included within the scope of the appended claims.

The invention claimed is:

1. A positive film having families of color value images printed in linear or mosaic design alternating with each other in one stratum of a positive film having two strata of light sensitive emulsion, said images being smaller in dimension than corresponding black and white design elements in another stratum of emulsion with which the images are registered, said difference in dimensions being compensated for by black areas between the individual color value images to permit altering the proportionate areas and densities of the design elements which are capable of being converted into elements of different colors.

2. Process of producing a two color transparency on a positive film having two layers of silver light sensitive emulsion, from two non-linear color value negatives of the same scene, which comprises photographically printing one of said negatives on one layer of emulsion through a screen plate having a series of alternating black lines and slightly wider transparent spaces to form spaced linear images of one color value on said emulsion, shifting said screen plate in a lateral direction until the transparent spaces register with the alternate unexposed linear portions of said emulsion and slightly overlap the adjacent edges of the exposed linear portions thereof, photographically printing the second negative on the same layer of emulsion through said screen plate to form linear images of the second color value alternating with the linear images of the first color value while forming double-exposed dividing lines between said images, simultaneously exposing the second emulsion to printing rays of light through a screen plate having alternating black lines and transparent spaces of equal width to form alternating exposed hard lines and unexposed soft lines in register with the linear images of the respective color values, covering the picture surface of said positive film with a protective coating, bleaching the alternate exposed lines of hardened silver halide gelatin in said second emulsion, subjecting said film to the action of a dye of one color having an affinity for said hardened gelatin, washing said film to remove said dye from said unexposed lines of soft gelatin, subjecting said film to the action of a second dye having an affinity for said soft gelatin, and washing said film to remove said second dye from the previously dyed lines of hard gelatin.

3. Process of printing motion pictures in lines on a positive film having two strata of light sensitive emulsion, from non-linear color value negative images of the same scene, which comprises photographically printing one of said negative images on one stratum of emulsion through a screen plate having alternating black lines and slightly wider transparent spaces to form spaced linear images in said stratum of emulsion, shifting said screen plate in a lateral direction until the transparent spaces register with the alternate unexposed linear portions of said emulsion and slightly overlap the adjacent edges of the exposed linear portions thereof, photographically printing the second negative image in the same stratum of emulsion through said screen plate to form linear images of the second color value alternating with the linear images of the first color value while forming double exposed dividing lines between said images, and exposing the other stratum of emulsion to printing rays of light through a screen plate having alternating black lines and transparent spaces of equal width to form alternating exposed and unexposed lines in register with said color value images.

4. Process of printing motion pictures in lines on a positive film having two layers of light sensitive emulsion on opposite sides of a support, from non-linear color value negative images of the same scene, which comprises photographically printing one of said negative images on one layer of said emulsion through a screen plate having a series of alternating black lines and slightly wider transparent spaces to form spaced linear images of one color value on said emulsion, shifting said screen plate in a lateral direction until the transparent spaces register with the alternate unexposed linear portions of said emulsion and slightly overlap the adjacent edges of the exposed linear portions thereof, photographically printing the second negative image on the same layer of said emulsion through said screen plate to form linear images of the second color value alternating with the linear images of the first color value while forming double exposed dividing lines between said images, and exposing the emulsion on the opposite side of said support to printing rays of light through a screen plate having alternating black lines and transparent spaces of equal width to form alternating exposed hard lines and unexposed soft lines in register with the respective color value images.

5. Process of printing motion pictures in lines on a positive film having two strata of light sensitive emulsion on the same side of a support, from non-linear color value negative images of the same scene, said emulsion containing a fugitive light retarding dye to prevent penetration of the light rays, which comprises photographically printing one of said negative images through said support and through a screen plate having alternating black lines and slightly wider transparent spaces to form spaced linear images in the lower stratum of emulsion nearest to said support, shifting said screen plate in a lateral direction until the transparent spaces register with the alternate unexposed linear portions of said emulsion and slightly overlap the adjacent edges of the exposed linear portions thereof, photographically printing the second negative image in the same stratum of emulsion through said screen plate to form linear images of the second color value alternating with the linear images of the first color value while forming double exposed dividing lines between said images, and exposing the upper stratum of emulsion furthest removed from said support to printing rays of light through a screen plate having alternating black lines and transparent spaces of equal width to form alternating exposed hard lines and unexposed soft lines in register with the color value images printed in the lower stratum of said emulsion.

6. Process of balancing for additively colored pictures by proportionately increasing or decreasing the quantity of dye to be absorbed by the printed and unprinted lines in one layer of emulsion on a support registered with lines of corresponding color value images in another layer of emulsion on said support, which comprises varying the width and density of the printed lines registered with the lines of one color value image and proportionately altering the width of the unprinted lines registered with the lines of the other color value image, converting said printed lines into lines of one color, and converting said unprinted lines into lines of another color.

7. A transparency comprising a support, a light sensitive emulsion on one side of said support having color value images printed in lines alternating with each other and separated from each other by black areas in one stratum of said emulsion nearest to said support, said images being registered with black and white lines printed in another stratum of said emulsion further removed from said support.

8. A transparency comprising a support having photographic emulsions on each side thereof, the emulsion on one side of said support bearing printed and developed black and white color value images in linear form alternating with each other and separated from each other by double exposed dividing lines, said images being protected with a varnish coating, the emulsion on the opposite side of the support bearing alternating printed and unprinted lines in register with said color value images, said printed lines being hardened and bleached and capable of absorbing a dye of a family having an affinity for hardened gelatin, and said unprinted lines being soft and capable of absorbing a differently colored dye of another family having an affinity for soft gelatin.

9. A transparency comprising a support having two strata of photographic emulsion on one side thereof, the lower stratum of emulsion nearest to said support bearing printed and developed black and white color value images in lines alternating with each other and separated from each other by double exposed black areas, the upper stratum of emulsion furthest removed from said support bearing alternating printed and unprinted lines in register with the color value images in the lower stratum of said emulsion, said printed lines being hardened and bleached and capable of absorbing a dye of a family having an affinity for hardened gelatin, and said unprinted lines being soft and capable of absorbing a differently colored dye of another family having an affinity for soft gelatin.

CHARLES W. BAUER.
HENRY KOHLBACHER.